May 25, 1965   J. W. NORRIS ETAL   3,185,393
INTEGRAL THERMOSTAT FOR INDOOR COMFORT EQUIPMENT
Filed Aug. 20, 1962   4 Sheets-Sheet 1
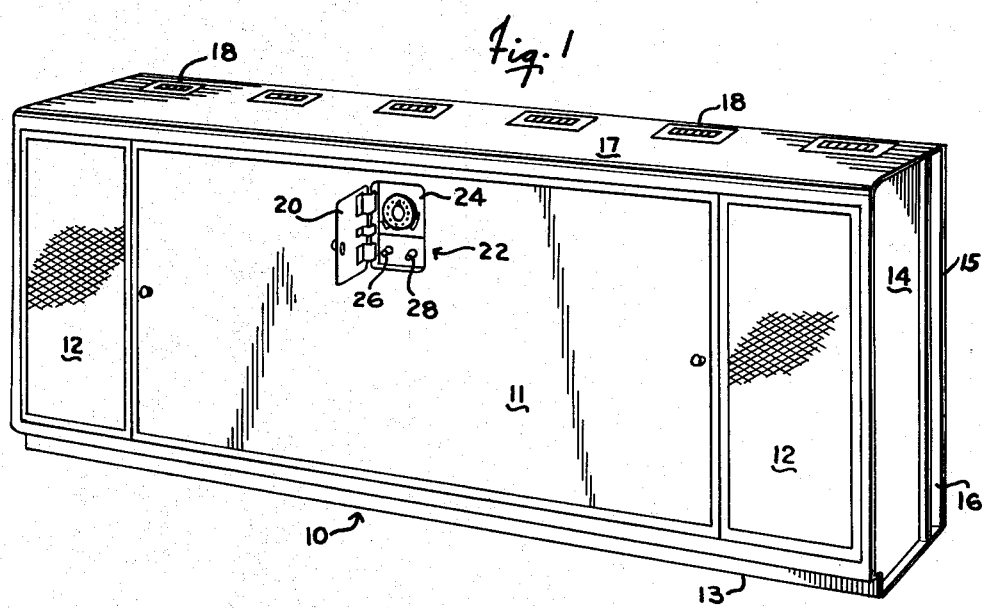
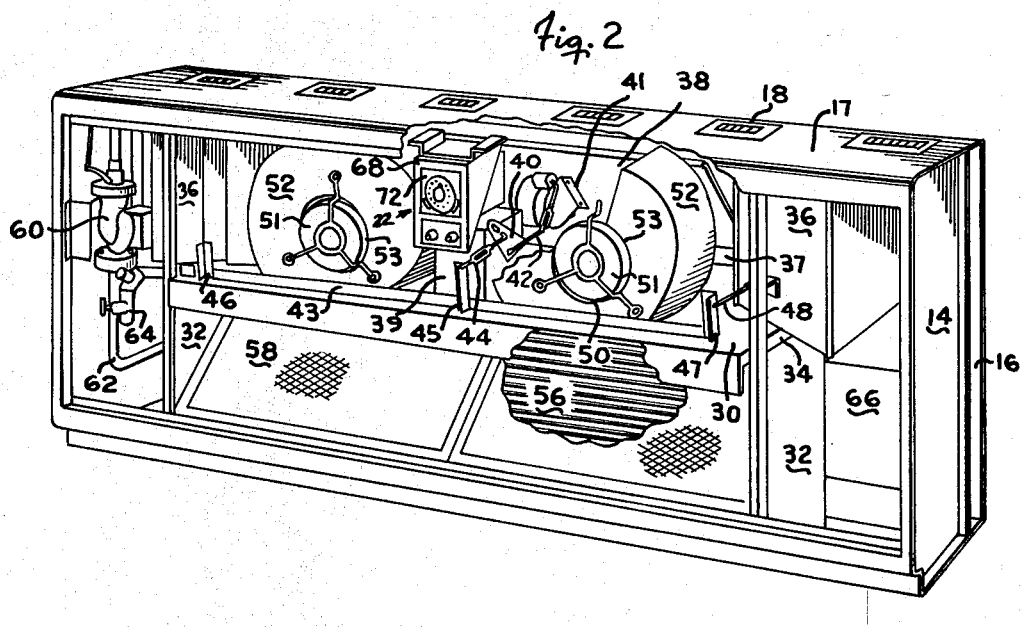
INVENTORS
JOHN W. NORRIS
WAYNE F. SIEVERDING
BY *Bair, Freeman & Molinare*
ATTYS.

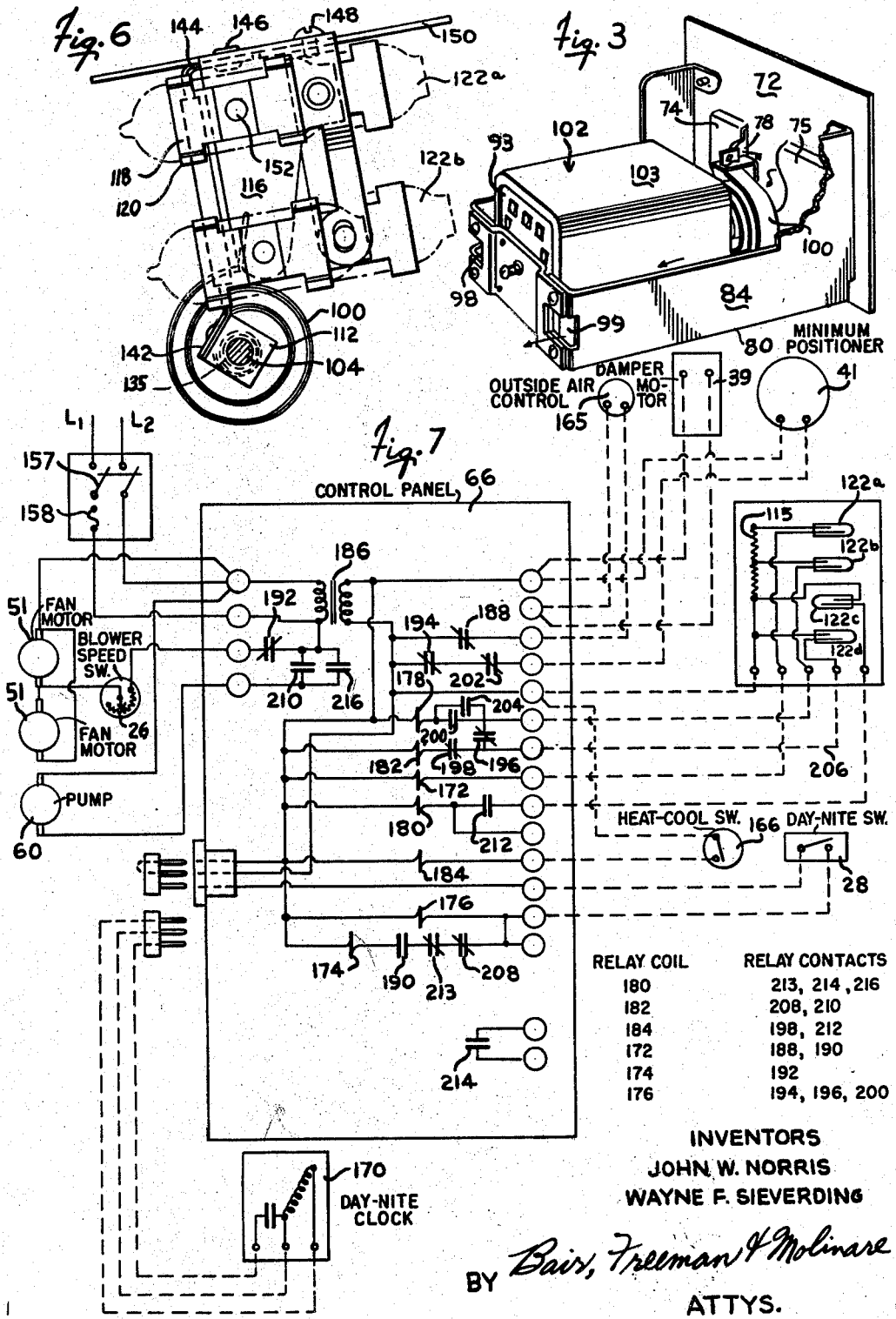

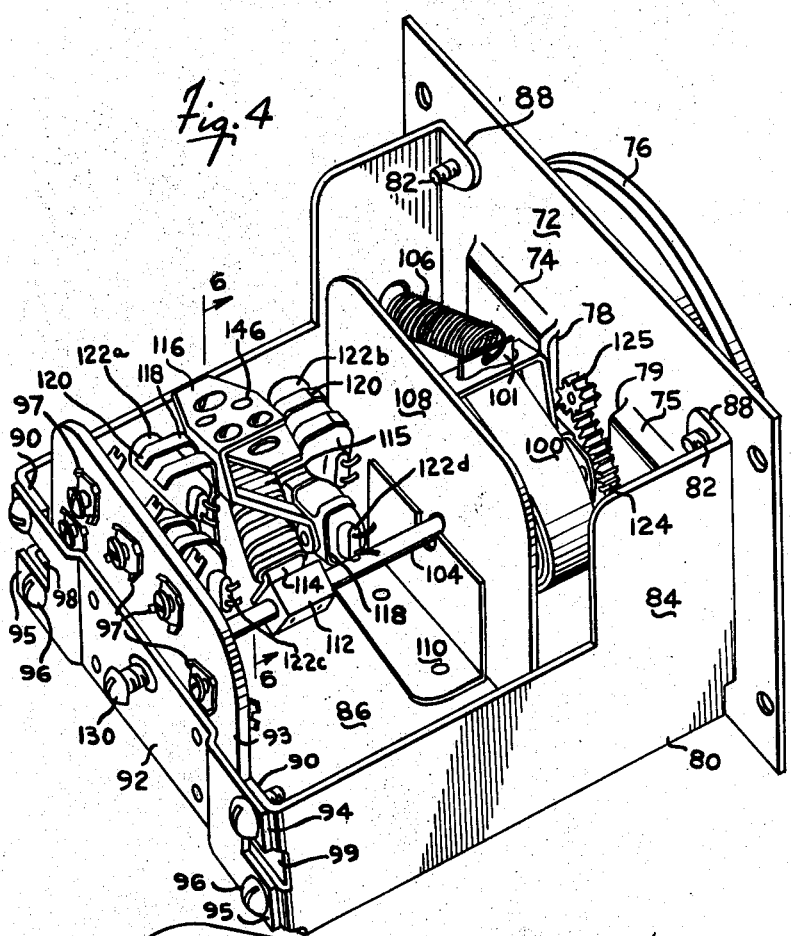
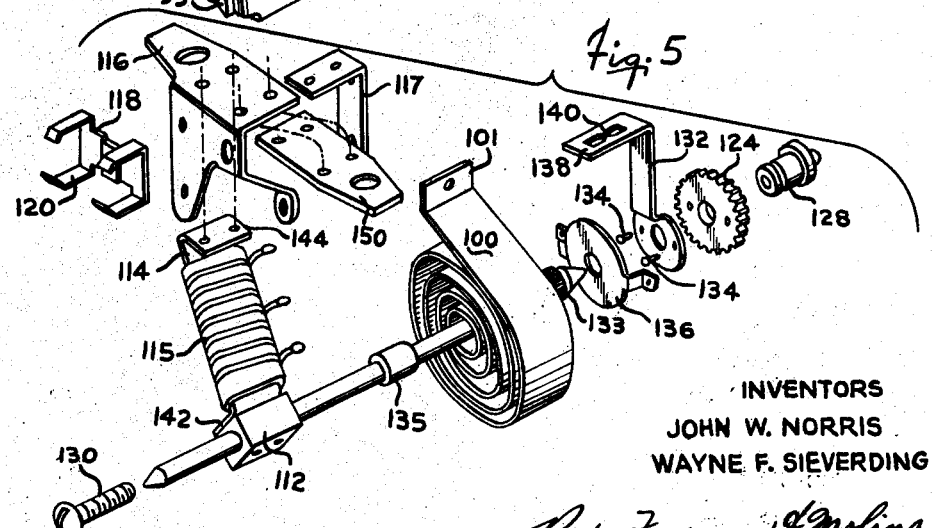

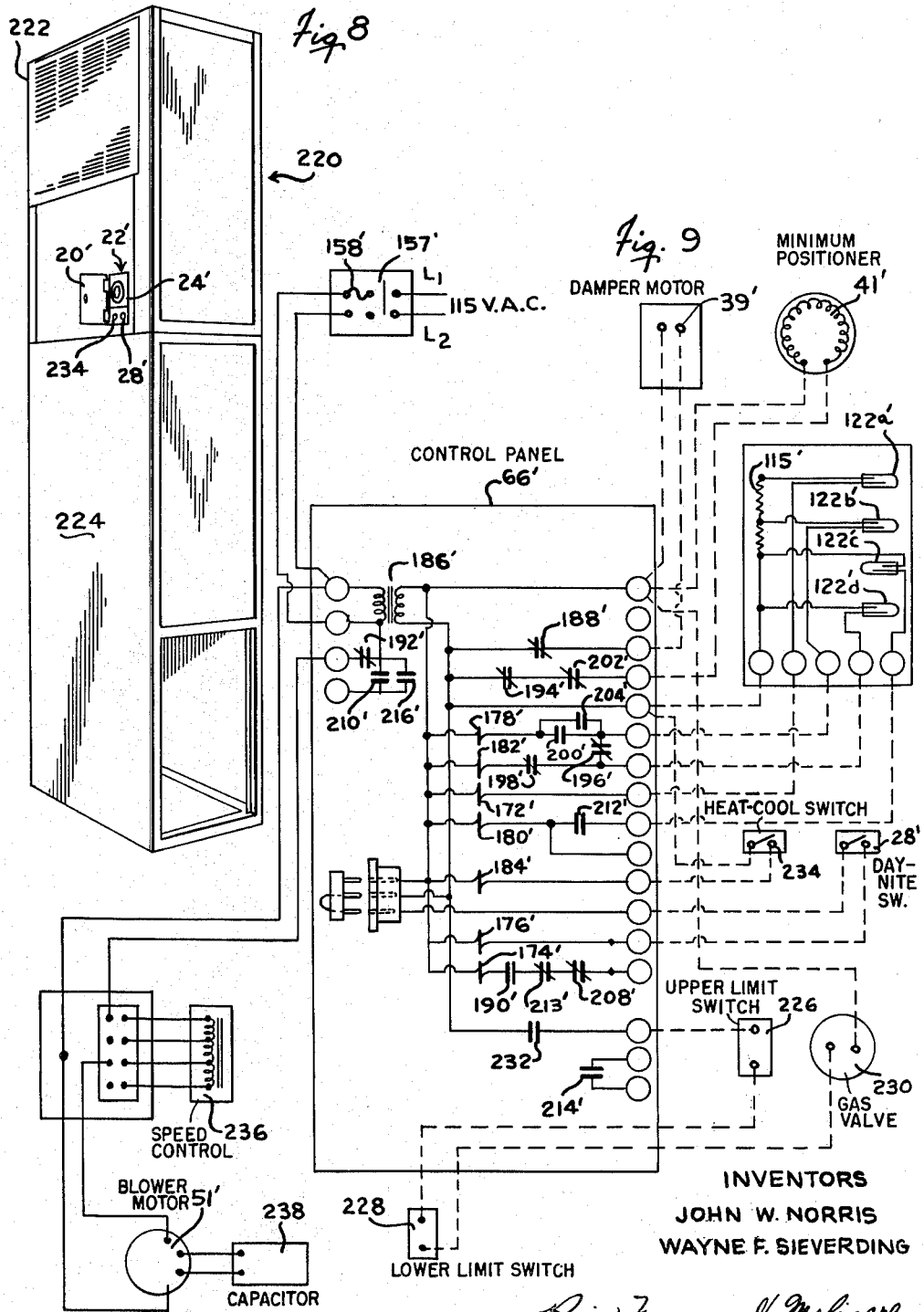

United States Patent Office 3,185,393
Patented May 25, 1965

3,185,393
INTEGRAL THERMOSTAT FOR INDOOR COMFORT EQUIPMENT
John W. Norris, Marshalltown, and Wayne F. Sieverding, Union Grove Lake, Iowa, assignors to Lennox Industries Inc., a corporation of Iowa
Filed Aug. 20, 1962, Ser. No. 218,494
10 Claims. (Cl. 236—38)

This invention relates to thermostats and more particularly to integral thermostats for use in air treating equipment.

A common method of treating air in an enclosure in a building, school or like structure, is to provide one or more air conditioning units or air treating units in each enclosure or area to be treated. With the casing of each unit is a suitable conditioning means, for example, a coil adapted to be supplied with either a hot conditioning medium for heating or a cold conditioning medium for cooling. Commonly, fan means are provided in the air conditioning or treating unit for passing air to be treated over the coil in such unit. Dampers are provided in the casing for regulating the entry of recirculated room air and ventilation air into the casing. The control for the fan means, for the dampers, and for the supply of conditioning medium is ordinarily a thermostat mounted on a wall in the area to be treated.

It has been difficult to find a proper wall location for the conventional wall-mounted thermostat. In recent classroom design, more and more wall space is being covered with cupboards or blackboards, so that good wall space for the thermostat is frequently scarce.

The thermostat should not be exposed to direct sunlight for such sunlight will adversely affect the operation of the thermostat. Ordinarily, an opening is cut into the wall behind the thermostat for the themostat wires. Frequently, this opening is not sealed and if there is a current of hot or cold air in the wall, the thermostat will not function properly.

Normally, the wall-mounted thermostat is wired in the field by an installing contractor, who is often unfamiliar with the nature of the thermostat. Often the contractor improperly wires the installation or improperrly identifies the color code for the various wires. As a result, much time is lost in ascertaining the proper wiring connections.

Considerable research effort has been expended in developing a thermostat that can be factory-assembled and wired within an air processing or air treating unit. Commercially available thermostats do not have the sensitivity required for use within air processing equipment that requires short and frequent cycling of the dampers therein, such operation being fundamental in the type of air processing equipment for which the thermostat of the present invention is adapted.

The air processing unit for which the thermostat of the present invention is adapted to be used utilizes fresh outside air for cooling the room throughout the heating season. Internal heat gains in these rooms or areas to be treated caused by occupancy, lights, and frequently high-solar gain from bright sunshine create the need for cooling when outdoor temperatures are actually below freezing. Thus, under extreme circumstances, cooling may be needed in such rooms in zero degree weather. Therefore, it is evident that producing indoor comfort in such spaces is much more of a cooling job than of a heating job. The accurate and sensitive control of the outside air function for cooling is one of the important responsibilities of the thermostat of the present invention, for in air processing units, outside air is used for cooling so long as the outside temperatures are low enough.

The air processing units employ electric two-position or three-position damper motors for controlling the recirculation and outside air dampers. By utilizing a thermostat of high sensitivity, we are able to obtain on-cycles for the heating and on-cycles for the 100% outside air ventilation cycle as short as one and one-half to two minutes, thus producing the effect of modulated control of indoor comfort. In other words, by cycling the damper motors frequently enough, the thermal inertia in the distribution system levels out the ups and downs of actual air discharge temperature sufficiently to produce the effect of modulation with much simpler and less expensive controls. The thermostat must be positioned within the casing of the air processing unit so that it accurately senses the proper control temperature and is not adversely affected by air movement within the casing.

An object of the present invention is to provide an air processing unit having therein an integral thermostat wherein the deficiencies and disadvantages of prior constructions are obviated.

Another object of the present invention is to provide an air treating unit with an improved thermostatic control means for controlling the damper motor within such unit.

It is another object of the present invention to provide an air treating unit containing an integral thermostat disposed in the air treating unit in the return air stream.

A further object of the present invention is to provide an integral thermostat for use in an air processing unit, the thermostat having a main thermal responsive means disposed in the air stream passing through the thermostat and having an anticipation bimetal within the thermostat completely shielded from the air stream through the thermostat, thus allowing for the use of only a small amount of anticipation heat and rendering the anticipation phase of the thermostat completely independent of the amount of air flowing through the thermostat.

This invention relates to an air treating unit adapted to be positioned in an area to be treated, such unit comprising a casing having a recirculated air inlet, a recirculated air outlet, and a ventilation air inlet; means for moving air through the housing; first damper means adjacent the ventilation air inlet for regulating the quantity of ventilation air entering the casing; second damper means for regulating the quantity of recirculated air passing through the casing; a damper motor for positioning the first and second damper means; and thermostatic control means for controlling the damper motor, the thermostatic control means comprising a housing in the casing having an inlet for receiving recirculated air and an outlet, shaft means rotatably mounted in the housing, thermal responsive means responsive to the temperature of the recirculated air passing through the housing for rotatably positioning the shaft means, switch means operable in response to the movement of the shaft means to actuate the positioning motor, and means for anticipating the action of the switch means.

This invention further relates to an integral thermostat comprising a housing having an inlet and an outlet, shaft means rotatably mounted in the housing, first thermal responsive means in the path of air flowing through the housing for positioning the shaft means in response to the temperature of the air, switch means in the housing operative in response to movement of the shaft means, an enclosure in the housing substantially insulating the switch means from the flow of air through the housing, second thermal responsive means within the enclosure supporting the switch means on the shaft means, and heating means responsive to a predetermined temperature condition for supplying heat to the second thermal responsive means to position the switch means carried thereon with respect to the shaft means.

Other objects and advantages to the present invention will be obvious from the foregoing description of a preferred embodiment of the invention. The invention will not be described by reference to the attached drawings, wherein like numerals refer to like elements and wherein:

FIGURE 1 is a perspective view of an air processing unit embodying the thermostat of the present invention;

FIGURE 2 is a perspective view partially in section and with parts broken away to illustrate the operative association of the components comprising the air processing unit of FIGURE 1;

FIGURE 3 is a perspective view of the thermostat of the present invention with the outer insulation removed therefrom;

FIGURE 4 is a perspective view similar to FIGURE 3 but with the enclosure removed to illustrate the second thermal responsive means and the switch means carried thereby;

FIGURE 5 is an exploded view of the internal components of the thermostat;

FIGURE 6 is a cross-sectional view of the thermostat taken generally along the line 6—6 of FIGURE 4;

FIGURE 7 is a schematic wiring diagram for the air processing unit of FIGURES 1 and 2;

FIGURE 8 is a perspective view of a modified air processing unit utilizing the thermostat of the present invention; and FIGURE 9 is a schematic wiring diagram for the modified air processing unit illustrated in FIGURE 8.

Referring now to FIGURE 1, there is illustrated an air processing unit or an air conditioning unit embodying the present invention. The air processing unit includes a casing 10 having a removable front cover 11, a base 13, sidewalls 14 and a top 17. Provided in the front of the casing are louvered inlet openings 12. Defined in the side of the casing 10 between the sidewalls 14 and the backwall 15 are outlet openings 16. It is noted that within the top 17 there are provided a plurality of outlet openings 18.

Provided in the front cover 11 is a spring-return door 20 which provides access to a control center 22 mounted within the casing 10. The control center comprises an integral thermostat 24, a blower speed switch 26 and a day-night switch 28. The functioning of these components will become more apparent from the description which follows.

FIGURE 2 illustrates the air processing unit of FIGURE 1 with the front cover removed and with parts broken away to illustrate more clearly the cooperative relationship of the components therein. Within the casing 10, there is provided a horizontal partition wall 30 detachably supported on the upright partition walls 32. Provided in each of the upright partitions is a recirculated air opening 34. The passage of air through the recirculated air openings is regulated by a damper 36 pivotally supported on each partition wall 32.

The backwall 15 of the casing 10 has a ventilation opening 37 therein. The ventilation or vent opening is adapted to be regulated by means of a pivotally mounted damper 38. Each of the dampers 36 and 38, preferably made from steel and edge lined with urethane foam to provide a tight air seal, is controlled by damper motor 39. Pivotally secured to the side of the damper motor 39 is a pivoted bracket 40 adapted to be connected to a minimum positioner 41 on damper 38 by means of a turnbuckle link 42. The minimum positioner 41 functions as an auxiliary means for controlling the position of the damper 38.

Pivotally secured on the horizontal partition wall 30 is a rock shaft 43. A turnbuckle link 44 connects the arm 45 on rock shaft 43 with the pivoted bracket 40 to permit pivotal movement of the rock shaft about its axis. Secured at the ends of the rock shaft 43 are arms 46 and 47, each of which is adapted to be operatively connected to the respective damper 36 by means of connecting link 48.

Thus, it is apparent that the actuation of the dampers 36 and 38 are interrelated and that as the recirculated air dampers 36 are opened, the ventilation damper 38 will be closed and vice versa. The minimum positioner 41 is adjustable and is adapted to override the damper motor 39 and control the damper 38 within a limited range, for example, from 0 to 30 percent outside ventilation air.

The means for moving air through the casing 10 comprises a pair of centrifugal fans 50 positioned on the horizontal partition wall 30. Each fan 50 is provided with a fan motor 51 operatively mounted on the scroll 52. As seen in FIGURE 2, the fan motor 51 is mounted in the inlet opening 53 in the scroll 52.

A heat exchange coil 56, which may be of conventional tube and fin construction, extends substantially transversely between the partition members 32 in the casing 10. Substantially coextensive with the heat exchange coil 56 is a filter 58. The supply of conditioning medium from a suitable source of either hot conditioning medium for heating applications or cold conditioning medium for cooling applications is a pump 60 communicating with a supply line 62 and a return line 64.

It is contemplated that an electrical control panel 66 will be provided in the casing 10 so as to permit electrical connection of all the electrical components of the air treating unit to be made in the factory and thereby minimize the electrical work needed in the field. In the field, suitable electric wires will be connected to the control panel 66, from a suitable source of power, thus communicating the control panel with the source of electrical power.

The control center 22 selectively controls the heating, cooling, ventilation, and day-night operation of the air treating unit. The major component of the control center and the subject of the present invention is the thermostat 24, which among other functions controls the off and on-cycle of the damper motor 39 and thereby properly positions the dampers 36 and 38. As is more readily apparent from FIGURES 3 and 4, the integral thermostat 24 of the present invention comprises housing means enclosing the thermostat components. The front plate 72 of the thermostat is affixed to a support bracket 68 on the suction side of the centrifugal fans so that a stream of recirculated room air will move through the thermostat 24.

Referring to FIGURES 3 and 4, there are shown more clearly the details of the integral thermostat 24. The front plate 72 has depressions 74 and 75 therein, which provide inlet openings 78 and 79 in the front plate 72, through which openings recirculated air may enter the thermostat.

Mounted on the face of the thermostat are indicating means 76 for indicating the desired temperature setting and the actual temperature of the area being treated, as sensed from the temperature of the recirculated air.

Extending rearwardly from the front plate 72 is a bracket 80. Such bracket is affixed to the front plate 72 by machine screws 82, which extend through flanges 88 on the side walls 84 of the bracket 80. Bracket 80 is further comprised of side walls 84 and a base 86 connected between the side walls. A bracket 92 is connected across the rear of the bracket 80 between side walls 84. The bracket 92 has spaced upper and lower flanges 94 and 95, respectively, at each side, such flanges being connected by machine screws 96 to the flanges 90 on the side walls 84. The flanges are spaced to define openings 98 and 99 in the housing means of thermostat 24. Thus, recirculated air enters thermostat 24 through openings 74 and 75 and is discharged from the thermostat through openings 98 and 99.

As can be seen in FIGURE 3, air entering the thermostat through the openings 78 and 79 in the front plate 72 passes over the main thermal responsive means 100, about the enclosure 102, and through the openings 98 and 99 in the rear of the housing means. By means of the enclosure 102, which comprises insulators 93 and 108, and cover 103, the auxiliary thermal responsive means within the enclosure are effectively insulated from the recirculated air being passed over the enclosure.

The main thermal responsive means 100, which preferably comprises a spirally-wound bimetallic member, is connected at one end to a shaft 104 rotatably mounted within the thermostat. The movement of the bimetallic member 100, in response to temperature of the recirculated air, is resisted by the spring 106, which is connected to a flange 101 formed on the free end of the bimetallic member 100.

The shaft 104 extends through an opening in insulator plate 108 which forms one wall of the enclosure 102. Such insulator plate 108 is connected to an angle member or shield 110 affixed to the wall or bottom 86.

Mounted on insulator 93 are terminals 97 by means of which the mercury switches 122 in the thermostat can be electrically connected in the control circuit.

Formed integrally on the shaft 104 within the enclosure is a support block 112, to which is suitably secured auxiliary thermal responsive means comprising an upstanding bimetallic support member 114. The support member 114 which comprises a bimetallic member adapted to move in response to temperature applied thereto by the anticipation heater wire 115 wound thereabout, carries four mercury switches 122 thereon.

Secured at the upper free end of the support member or bimetallic member 114 is a generally U-shaped bracket 116, upon which are affixed clips 118. Formed on the clips are resilient fingers 120 adapted to clamp the mercury switches 122 therebetween.

As is believed apparent from the foregoing description, since the thermostat 24 is disposed on the suction side of blowers 51, recirculated room air will enter the thermostat through the openings 78 and 79 defined in the front wall 72 thereof and will pass over the main thermal responsive means 100, which will appropriately expand or contract in response to the temperature of the recirculated air so as to rotate the shaft 104. Fixedly mounted on the shaft 104 is an auxiliary thermal responsive means 114. Such thermal responsive means 114 is insulated by means of the enclosure 102 from the recirculated room air and is responsive to the temperature of the resistance member 115 wound thereabout. Secured to the free end of the support member 114 is a tube bracket 116 upon which are mounted mercury switches 122. Upon appropriate pivoting of the shaft 104, the mercury switches will be actuated and the circuit will be completed to the various control elements and to the damper motor 39. The damper motor 39 will be actuated to properly position the dampers 36 and 38 to regulate the proportions of room air and ventilation air drawn into the unit and discharged from the casing 10 through the openings 18 and 16 into the room to be treated.

Secured to the shaft 104 adjacent the front plate 72 is a gear 124. The gear 124 engages with a pinion gear 125 pivotally supported on the front plate 72 to position a pointer in the indicating means 76 which indicates the temperature of the recirculated room air.

Considering now FIGURE 5, there is illustrated an exploded perspective view of the internal components of the integral thermostat 24. The shaft 104 is supported at one end by a gear bearing 128 supported by front plate 72 and at the other end by a shaft bearing 130 which extends through and is affixed to the bracket 92. The gear 124 is fixedly mounted on the shaft 104 and is connected to the lever 132 by suitable connecting means comprising machine screws 134. Also disposed on the shaft 104 is a stop washer 136 adapted to limit the movement of the lever 132.

The lever 132 includes a top transverse portion 138 within which there is provided an elongated slot 140 for receiving the flange 101 on the free end of the thermal responsive means 100. The inner end of the main thermal responsive means 100 is fixedly connected to a collar 135 which fixedly engages the knurled portion 133 of the shaft 104.

The flange 142 on one of the bimetal 114 is adapted to be connected by suitable means, as for example, machine screws, to the support block 112 which is integrally formed on the shaft 104. Secured to the flange 144 on the free end of the bimetal 114 is a generally U-shaped bracket 116 upon which are mounted the mercury switches 122. The bracket 116 includes a member 117 affixed thereto. As aforenoted, the mercury switches are detachably retained on the spring clips 118, which are supported on the U-shaped bracket 116.

The rear end of the shaft 104 is mounted on the screw bearing 130, the outer portion of which is threaded and adapted to be engaged in the bracket 92.

Considering FIGURE 6, there is illustrated a cross-sectional view taken generally along the line 6—6 of FIGURE 4 and showing the assembly of the mercury switches and the association of the generally U-shaped bracket with the bimetal 114 and the shaft 104. The view of FIGURE 6 may be considered diagrammatic in that the shield 108 is omitted to show main sensing bimetal 100 mounted on the shaft 104.

The rivets 146 affix the generally U-shaped bracket 116 to the flange 144 on the free end of the bimetal 114. The plate 150 is affixed to the top of the U-shaped bracket by means of suitable connecting means, as for example, machine screws 148. Similarly, the U-shaped clips for retaining the mercury switches are affixed to the U-shaped bracket by machine screws or rivets 152.

By means of the foregoing, it is seen that the thermostat 24 incorporates two bimetals positioned on a single arbor or shaft. The main thermal responsive means positions the shaft 104 in response to the temperature of the recirculated room air passing thereover. The second or auxiliary thermal responsive means, which supports the mercury switches, is insulated from the recirculated air stream and implements the anticipation job that is vital to the type of operation contemplated for the air treating apparatus of the present invention. It is essential that the second thermal responsive means be insulated so that a relatively minor amount of heat may be added to provide the desired anticipation to make and break the mercury switches 122 with just a few degrees of heat. In this way, the droop or change in control level with weather changes is minimized. If artificial heat were to be added to the main thermal responsive means to achieve the desired acceleration or anticipation, it would be necessary to add so much heat that the droop under extremes of weather would be excessive. Further, the active air stream over this main thermal responsive means wipes or transfers the heat away from it so rapidly that a substantial amount of artificial heat would be necessary to accomplish the desired acceleration.

It is believed that the functioning of the internal thermostat in its environment within the air treating apparatus will be made more clear when the schematic wiring diagram of FIGURE 7 is considered.

Current is adapted to be supplied to the electrical circuit from a suitable source, for example, a 115 volt A.C. power source. Current flows from the power source through lines $L_1$ and $L_2$ to the main switch 157. From the main switch 157, current is distributed to the various components of the electrical system. A conventional fuse 158 is utilized in the circuit.

Considering the major components of the electrical system, it will be seen that the centrifugal fan motors 51, the pump 60 and the speed control switch 26 are disposed outside of the main control panel 66. Also disposed outside of the control panel 66 is the integral thermostat 24 containing the four mercury switches $122a$, $122b$, $122c$ and $122d$, respectively. Other major components of the electrical system lying outside of the control panel 66 are the damper motor 39, the minimum positioner 41 and the outside air control 165, which functions to close the outside air damper 38 to minimum ventilating position when the outside air becomes too warm to use for fresh air cooling. Also provided in the electrical circuit are the day-night switch 28, the heat-cool switch 166 and the day-night time clock 170.

The heat-cool switch 166 is located on the primary piping carrying conditioning medium to the coil 56. The switch, which is automatic, senses whether heating or cooling medium is circulating and dictates either heating or cooling functions. The day-night time clock 170 provides for automatic night setback of the control temperature.

Among the components housed within the control panel is a transformer 186 adapted to reduce the line voltage to a control voltage, for example, 115 volts down to 24 volts. Also housed within the control panel are the vent relay coil 172, the fan relay coil 174, the night relay coil 176, the heat-saver relay coil 178, the cooling relay coil 180, the heat relay coil 182 and the interrupter relay coil 184.

The thermostat of the present invention is designed to accomplish the following control actions, but it is to be understood that in some applications not all of the operations will be performed.

(1) Turn the heat source on and off.
(2) Open the outside air damper to an intermediate position to permit the entry of ventilation air into the casing 10.
(3) Turn the outside air damper to the 100 percent open position when room temperature overruns the thermostat control point setting by about one degree.
(4) Turn the source of cooling on and off when ventilation cooling is adequate and an air cooling coil or a separate air cooling unit is used in the system.
(5) Set the heating control point back to a lower temperature during the night or non-occupancy cycle and simultaneously close the outside air damper so that the system operates on 100 percent recirculated air for maximum economy.

It will be noted that the air treating or processing unit of FIGURES 1 and 2 is adapted to be supplied with either hot or cold conditioning medium for it is readily apparent that in many applications, one zone of a building will require heating while at the same time a different zone may require cooling. The thermostat of the present invention is integral with an air processing unit and is adapted to effectively control the environment being treated by the associated air processing unit during heating, cooling, ventilation, and day-night operation.

Essentially the operation of the electrical circuit of FIGURE 7 is in the following manner.

The vent switch 122a closes on temperature fall, rather than on temperature rise. Thus, when switch 122a is open, vent relay coil 172 is deenergized, vent relay contact 188 is closed and vent relay contact 190 is opened. This arrangement allows the series anticipation heater 115 to be used on this function of the thermostat. Contact 188 completes the circuit carrying power to the damper motor 39, which in turn opens the outside air damper 38. Vent relay contact 190 is in series with the fan relay coil 174. Energization of relay coil 174 opens the contact 192 and breaks the circuit to the fan motors 51.

During operation at night, the night relay 176 is energized by placing the day-night switch 28 mounted on the thermostat 24 at its night position. The normally-closed night relay contact 194 opens, interrupting the power to the minimum positioner 41, thus closing the outdoor air damper 38 completely at night when full ventilation is not being called for by the thermostat 24. The night relay contact 196 allows the impulse from the switch 122b in thermostat 24 to flow to the heat relay coil 182 through the normally-closed contact 198 of the interrupter relay coil 184. The contact 196 is open at night thus allowing the temperature in the area to be treated to depress to the night-heat control point during winter conditions.

The contact 200 of the night relay closes at night when the relay coil 176 is energized. When the temperature of the classroom or area to be treated depresses enough to close the thermostat switch 122b, the contact 200 allows current to flow to the heat-saver relay coil 178. The normally-closed heat-saver relay contact 202 is opened at this time upon energization of the heat-saver relay coil 178 and is held open by the normally-open heat-saver relay contact 204 supplying the impulse from the switch 122b of the thermostat 24 to the heat-saver relay coil 178. Thus, even after the day-night switch 28 is moved to the day position, the minimum positioner 41 is not energized until the day-heat switch 122b in the thermostat 24 is satisfied, breaking the circuit to the heat-saver relay 178, which is then held open by the normally-open heat-saver relay contact 202 until the next night setback. This functioning takes place during the morning warm-up period.

The heat relay coil 182 is energized from the day-heat switch 122b through the night relay contact 196 during the day or from the night-heat thermostat switch 122d through the line 206. The heat-saver contact 208 in series with the fan relay coil 174 is used to energize the blowers 51 on a demand for heat at night. The heat relay contact 210 energizes the water pump 60 when there is a demand for heat and there is hot conditioning medium in the pipes.

When there is a daytime demand for cooling, the switch 166 is closed and switch 28 is open. The interrupter relay 184 is energized from the heat-cool switch 166 which is adapted to be strapped to the main conditioning medium supply piping. The interrupter relay contact 198 interrupts any call for heat when the heat-cool switch 166 is in the cool position. The interrupter relay contact 212 interrupts a call for mechanical cooling when the heat-cool switch 166 is on heat, for when switch 166 is on heat, relay coil 184 is deenergized.

The cooling relay coil 180 is energized from the cool thermostat switch 122c. The cooling relay contact 214 is used to bring on a high-side air conditioning unit when direct expansion air conditioning is employed. Cooling relay contact 213 is in series with contacts 190 and 208 and fan relay coil 174 and cooperates with relay coil 174 to control the blowers 51. Upon energization of relay coil 180, the contact 216 is closed to energize the water pump 60, thus supplying cold conditioning medium to the coil 56 in the air treating unit.

In FIGURE 8, there is disclosed a modified air treating unit 220 with which the integral thermostat of the present invention may be utilized. The air treating unit compromises two separate completely assembled sections, a blower section 222 and a gas heating section 224. The control center 22' including the integral thermostat 24' of the present invention is disposed beneath a cover 20' in the blower section 222. As in the preferred embodiment of the present invention, the thermostat is located on the suction side of the blower in the blower section 222.

All controls are factory-installed, wired, and tested. After joining the blower and heating sections, the only things necessary to do in the field are connect the power supply, the flue pipe and the gas supply.

It is understood that a separate cooling unit is utilized with the air treating unit 220 if auxiliary air cooling is desired.

Turning now to the control wiring diagram of FIGURE 9, it is seen that basically the system is the same as that previously considered. Accordingly, the like components will be designated with prime numerals. The basic difference between the two systems is the provision in the control system of FIGURE 9 of the controls for the gas heating. Such controls include an upper-limit switch 226, a lower-limit switch 228 and an automatic gas valve 230. Also a single blower 51' having a speed controller 236 is utilized. Capacitor 238 is provided for the blower 51'.

It will be noted that the heat relay 182' is provided with a contact 232 to complete a circuit which includes the upper-limit switch, the lower-limit switch and the automatic gas valve.

The heat-cool switch 166 is not of the snap-action type as in the circuit of FIGURE 7 inasmuch as there is no water piping utilized with the air processing unit of FIGURE 8. In its place, there is provided a heat-cool switch 234 on the thermostat 24.

If desired, the day-night time clock utilized with the previous control system may also be utilized in the present control system. The use of the day-night time clock is conventional and further explanation is believed unnecessary.

The operation of the controls are essentially the same as the operation of the control system illustrated in FIGURE 7 and accordingly, further explanation is believed unnecessary.

By the present invention, there has been provided an air treating unit having an integral thermostat therein. The thermostat is factory-wired and tested so that field installation thereof is obviated. Within the integral thermostat are four mercury bulbs which control heating, cooling, ventilation and day-night operation.

The integral thermostat includes a main thermal responsive means which is disposed in the path of recirculated air. Shielded from the air stream is an anticipation bimetal upon which are mounted four mercury switches. The anticipation phase of the thermostat is completely independent of the amount of air flowing through the thermostat and is, therefore, insensitive to the negative static pressure prevailing inside the casing in the area in which the thermostat is applied. This is an important feature as it eliminates the necessity for field adjustment of anticipation heat as is sometimes necessary with other thermostats. Thus, by the present design, a constant environment is provided in which all of the anticipation takes place. By virtue of the ocnstant environment, it is possible to design the same rate of temperature rise during a heating cycle as we have rate of temperature drop after the heating cycle. This is also true of the ventilation anticipation cycle. The equal rate of rise and fall of anticipation temperature provides a minimum of control point hunting which is a very important consideration when controlling an environment that changes load instantly, for example, a classroom wherein all the students leave at the lunch hour or during a recess.

The integral thermostat is especially designed to control an air treating unit utilizing damper motors for controlling recirculation and outside air dampers. The thermostat is built sensitive to give on-cycles for heating and on-cycles for the 100 percent outside air ventilation cycle as short as one and one-half to two minutes. In essence, by cycling the dampers frequently enough, the thermal inertia in the distribution system levels out the ups and downs of actual air discharge temperatures sufficiently to produce the effect of temperature modulation with much simpler and less expensive controls.

The thermostat is mounted in the air processing unit where it will always be subject to the suction of the blower fan and wherein recirculated air will be drawn through the housing means of the thermostat.

The thermostat of the present invention satisfactorily fulfills the need for an integral thermostat of extreme sensitivity which can be factory-mounted within an air processing unit.

While we have shown a preferred form of our invention and a single modification thereof, it will be obvious that other modifications will appear to those persons skilled in the art and we desire that our invention be limited only within the scope of the following claims.

We claim:

1. An air treating unit adapted to be positioned in an area to be treated comprising a casing having a recirculated air inlet, a recirculated air outlet, and a ventilation air inlet, means for moving air through said casing, damper means adjacent the ventilation air inlet for regulating the quantity of ventilation air entering said casing, said damper means including a damper motor, and thermostatic control means for controlling the damper motor, said thermostatic control means comprising a housing in said casing having an inlet for receiving recirculated air and an outlet, shaft means rotatably mounted in said housing, first thermal responsive means responsive to the temperature of the recirculated air passing through said housing for rotatably positioning said shaft means, a chamber defined in said housing and being insulated from said recirculated air, second thermal responsive means carried on said shaft means within said chamber, switch means on said second thermal responsive means operable in response to the movement of the shaft means to actuate the positioning motor.

2. An air treating unit as in claim 1 including a damper movably mounted in the casing adjacent the recirculated air inlet, said damper being linked to said damper means so as to be movable therewith.

3. In an air conditioning unit for treating an enclosed area, the combination of a casing, conditioning means in said casing adapted to be connected to a source of conditioning medium, means for supplying conditioning medium to said conditioning means, fan means in said casing for moving air over said conditioning means and discharging it into the area to be treated, damper means for regulating the entry of air into said casing, and temperature responsive means for controlling said damper means and said fan means in said casing, said controlling means comprising a housing disposed on the suction side of the fan means, said housing having an opening therein for permitting area air to enter said housing, a shaft rotatably mounted within said housing, a first bimetal for rotating said shaft in response to a temperature condition of said area air, an enclosure within said housing surrounding a portion of said shaft, switch means disposed within said enclosure for actuating the fan means, the supplying means and the damper means in response to predetermined movement of the shaft, and means for accelerating the action of the switch means comprising a second bimetal carried on said shaft and disposed within said enclosure, said second bimetal supporting said switch means and having a heater assembly in heat exchange relation therewith for supplying anticipation heat thereto.

4. An air conditioning unit as in claim 3, wherein said damper means comprise a first damper movable to open and close an inlet opening in the casing communicating with the area air to be treated, a second damper movable to open and close a ventilation air opening in the casing and motor means for actuating said dampers.

5. For use in an air conditioning unit having a casing within which are provided fan means and damper means, the improvement comprising an integral thermostat adapted to be mounted within said casing, said integral thermostat comprising a housing adapted to be positioned on the suction side of the fan means, said housing having an inlet opening for permitting air to be treated to enter said casing and an outlet opening for permitting air to be discharged from the housing, a shaft rotatably mounted within said housing, bimetal means for rotating said shaft in response to the temperature of said area air, an enclosure within said housing surrounding a portion of said shaft, switch means carried on said shaft within said enclosure for actuating said fan means and said damper means, and temperature responsive means for accelerating the action of the switch means disposed within the enclosure.

6. A thermostat for controlling a conditioning device remote from an area to be conditioned, said thermostat adapted to be positioned within such device, said thermostat comprising a housing adapted to be disposed on the suction side of a fan apparatus in said device, said housing having an opening for permitting air to enter said housing, a shaft rotatably supported in said housing, spirally wound bimetallic means for rotating said shaft in response to a temperature condition of the air, an enclosure within said housing surrounding a portion of said shaft, the interior of said enclosure being substantially closed to the air passing through said housing, switch means carried on said shaft within said enclosure, and thermal responsive means for accelerating the action of the switch means in response to a predetermined temperature condition, said thermal responsive means comprising a bimetallic member supporting said switch means thereon.

7. A thermostat as in claim 6, wherein said thermal responsive means include a heater assembly for supplying anticipation heat to said bimetallic member within said enclosure.

8. In an air treating unit, an integral thermostat comprising a housing having an inlet and an outlet, shaft means rotatably mounted in said housing, first thermal responsive means in the path of air flowing through the housing for positioning said shaft means in response to the temperature of the air, switch means in said housing operative in response to movement of the shaft means, an enclosure in said housing substantially insulating the switch means from the flow of air through the housing, a second thermal responsive means within said enclosure supporting said switch means on said shaft means, and heating means responsive to a predetermined temperature condition for supplying heat to said second thermal responsive means to position the switch means carried thereon with respect to the shaft means.

9. An integral thermostat as in claim 8, wherein each thermal responsive means comprises a bimetallic member.

10. An integral thermostat as in claim 8, wherein said switch means comprise a plurality of mercury bulb switches.

References Cited by the Examiner
UNITED STATES PATENTS

| | | | |
|---|---|---|---|
| 1,728,793 | 9/29 | Gano | 200—122.01 |
| 1,818,546 | 8/31 | Evans | 236—68 |
| 1,975,130 | 10/34 | Stewart | 236—38 |
| 1,991,010 | 2/35 | Bucklen. | |
| 2,006,534 | 7/35 | Bridges | 236—38 |
| 2,045,790 | 6/36 | Midyette | 236—38 |
| 2,564,120 | 8/51 | McLean | 236—68 |
| 2,787,946 | 4/57 | Gannon | 236—38 |
| 2,831,638 | 4/58 | Fulk | 236—68 |
| 3,051,451 | 8/62 | Bierwirth et al. | 236—68 |

FOREIGN PATENTS

| | | |
|---|---|---|
| 553,336 | 5/43 | Great Britain. |

EDWARD J. MICHAEL, *Primary Examiner.*